United States Patent
Fu (12)

(10) Patent No.: US 11,826,990 B2
(45) Date of Patent: Nov. 28, 2023

(54) MULTI-LAYER ARTICLES AND METHODS FOR PRODUCING THE SAME

(71) Applicants: BAXTER INTERNATIONAL INC., Deerfield, IL (US); BAXTER HEALTHCARE SA, Glattpark (CH)

(72) Inventor: Chengjie Fu, Shanghai (CN)

(73) Assignees: Baxter International Inc., Deerfield, IL (US); Baxter Healthcare SA, Glattpark (CH)

( * ) Notice: Subject to any disclaimer, the term of this patent is extended or adjusted under 35 U.S.C. 154(b) by 14 days.

(21) Appl. No.: 16/957,850

(22) PCT Filed: Jan. 5, 2018

(86) PCT No.: PCT/CN2018/071582
§ 371 (c)(1),
(2) Date: Jun. 25, 2020

(87) PCT Pub. No.: WO2019/134120
PCT Pub. Date: Jul. 11, 2019

(65) Prior Publication Data
US 2021/0053321 A1 Feb. 25, 2021

(51) Int. Cl.
*B32B 27/08* (2006.01)
*B32B 7/04* (2019.01)
(Continued)

(52) U.S. Cl.
CPC ............. *B32B 27/08* (2013.01); *B32B 7/04* (2013.01); *B32B 27/304* (2013.01);
(Continued)

(58) Field of Classification Search
None
See application file for complete search history.

(56) References Cited

U.S. PATENT DOCUMENTS 3,780,140 A * 12/1973 Hammer ................. C08L 73/00
525/185
5,089,556 A * 2/1992 Tabor ..................... B32B 15/08
525/539
(Continued)

FOREIGN PATENT DOCUMENTS

| AU | 2005237130 | 12/2005 |
|---|---|---|
| CN | 1486243 | 3/2004 |

(Continued)

OTHER PUBLICATIONS

Fan—3D Cooland & Warp overmolding process—ANTEC—2005 (Year: 2005).*
(Continued)

*Primary Examiner* — John Vincent Lawler
(74) *Attorney, Agent, or Firm* — K&L Gates LLP (57) ABSTRACT

The present disclosure provides multi-layer articles that comprise a polyolefin component and a polymer blend attached to the polyolefin component, wherein the polymer blend includes (1) a propylene and α-olefin copolymer in an amount from about 15% to about 70% by weight of the polymer blend, and (2) a carbon monoxide-containing polyolefin-based copolymer in an amount from about 25% to about 85% by weight of the polymer blend. The polymer blend has an extractables fraction with pH higher than 5. Also provided are methods of bonding a first layer comprising polyvinyl chloride to a second layer comprising the disclosed polymer blend.

19 Claims, 1 Drawing Sheet

(51) Int. Cl.
  *B32B 27/30* (2006.01)
  *B32B 27/32* (2006.01)
  *B32B 37/00* (2006.01)

(52) U.S. Cl.
  CPC ............ *B32B 27/308* (2013.01); *B32B 27/32* (2013.01); *B32B 37/0038* (2013.01); *B32B 2250/02* (2013.01); *B32B 2250/03* (2013.01); *B32B 2250/246* (2013.01); *B32B 2323/04* (2013.01); *B32B 2323/10* (2013.01); *B32B 2327/06* (2013.01); *B32B 2333/08* (2013.01); *B32B 2333/12* (2013.01); *B32B 2535/00* (2013.01)

(56) References Cited

U.S. PATENT DOCUMENTS

| | | | |
|---|---|---|---|
| 5,234,986 A | | 8/1993 | McBride |
| 5,912,084 A | * | 6/1999 | Hausmann ......... C09J 123/0853 428/476.3 |
| 6,558,809 B1 | * | 5/2003 | Kelch ................. C08J 5/18 428/522 |
| 2003/0204017 A1 | * | 10/2003 | Stevens ................ C08L 23/142 526/170 |
| 2007/0184273 A1 | * | 8/2007 | MacDonald ........ B29C 45/1418 425/576 |
| 2008/0145581 A1 | | 6/2008 | Tanny |

FOREIGN PATENT DOCUMENTS

| | | | | |
|---|---|---|---|---|
| CN | 104149434 | | 11/2014 | |
| CN | 104149459 | | 11/2014 | |
| EP | 1769907 | | 4/2007 | |
| EP | 1769907 A1 | * | 4/2007 | ............. B32B 27/08 |
| WO | 02053359 | | 7/2002 | |
| WO | WO-02053359 A1 | * | 7/2002 | ........... A61L 29/126 |
| WO | 03055943 | | 7/2003 | |
| WO | 2004/026961 | | 4/2004 | |
| WO | 2013065579 | | 5/2013 | |

OTHER PUBLICATIONS

Arber—EP 1769907 A1—CN D3—MT—two layer laminate of PVC and ethylene-acrylate copolymer—2007 (Year: 2007).*
International Search Report for PCT/CN2018/071582 dated Sep. 14, 2018 (3 pages).
Search Report for European App. No. 18898892.7 dated Jul. 7, 2021 (7 pages).
China Office Action for App. No. 201880081830.8 dated Dec. 21, 2021 (8 pages).
Search Report for European App. No. 22165384.3 dated May 25, 2022 (6 pages).
Chinese office action dated Jul. 5, 2022 for App. No. 201880081830.8 (8 pages).
Chinese office action dated Jan. 18, 2023 for App. No. 201880081830.8 (8 pages).

* cited by examiner

MULTI-LAYER ARTICLES AND METHODS FOR PRODUCING THE SAME

BACKGROUND

The container-closure system of continuous ambulatory peritoneal dialysis (CAPD) products typically includes a solution bag, a drain bag, as well as port tubes, connective tubing, one or more injection sites, and other injection molded components. The injection molded components typically function as closures or connectors, e.g., medication ports, couplers, and/or frangible components. Based on the materials used for the solution bag, drain bag, and tubing, container-closure systems could be divided into total polyvinyl chloride (PVC) systems, or total non-polyvinyl chloride (non-PVC) systems, and hybrid systems incorporating both PVC and non-PVC components.

In total PVC systems, the solution bag, drain bag, port tube, tubing, and other injection molded components are made from PVC. A PVC-based injection molded part is frequently connected with PVC tubing by solvent bonding or radio frequency energy. Alone, PVC is a hard and rigid substance. However, when PVC is plasticized with a plasticizer, PVC becomes flexible yet strong, is kink resistant, and can be easily solvent welded to other polymeric components using solvents such as cyclohexanone. Due to concerns about the plasticizer, residual monomer, and environmental pollution, however, total PVC systems have not been well accepted by the public and governments in some countries or regions of the world.

Total non-PVC systems resolved these concerns. In the total non-PVC system, the solution bag, drain bag, port tubes, tubing, and other injection molded components are all made from non-PVC materials, usually polypropylene, polyethylene, and elastomers. Non-PVC injection molded parts can be connected with non-PVC tubing by autoclave heat bonding during steam sterilization, heat sealing, solvent bonding, or just high interference mechanical bonding. Due to the higher cost of non-PVC materials relative to PVC, however, total non-PVC systems are more expensive than total PVC systems. Accordingly, it is desirable to provide an improved total non-PVC system.

SUMMARY

A hybrid system using non-PVC materials for the components in contact with the peritoneal dialysis solution during steam sterilization, while using PVC for other parts of the system, provides a balance between reducing cost and resolving PVC-related concerns. The hybrid system has at least one connection or interface between non-PVC based and PVC based components, for example between a non-PVC injection molded part and a segment of PVC tubing.

The present disclosure provides multi-layer articles and methods for producing the same. In some embodiments, the multi-layer articles of the present disclosure comprise a polyolefin component and a polymer blend attached to the polyolefin component, wherein the polymer blend includes (1) a propylene and α-olefin copolymer in an amount from about 15% to about 70% by weight of the polymer blend, and (2) a carbon monoxide-containing polyolefin-based copolymer in an amount from about 25% to about 85% by weight of the polymer blend. In one embodiment, the polymer blend has low-acidity extractables (resulting in an extractables pH higher than 5 when an extraction is performed according to Chinese Standard YBB00242004-2015 and the pH is measured in accordance with General Rule 0631 of Chinese Pharmacopoeia 2015, Part 4). As used in this disclosure, the term 'propylene and α-olefin copolymer' includes not only copolymers of propylene with higher (i.e. $C_4^=$ or greater) α-olefins, but also copolymers of propylene with ethylene, with or without another α-olefin comonomer. Accordingly, as used in this disclosure, the term "α-olefin" includes ethylene.

In each or any of the above- or below-mentioned embodiments, the polymer blend may be attached to the polyolefin component by overmolding.

In each or any of the above- or below-mentioned embodiments, the carbon monoxide-containing polyolefin-based copolymer may be selected from the group consisting of ethylene-$C_{1-8}$ alkyl acrylate-carbon monoxide terpolymer and ethylene-$C_{1-8}$ alkyl methacrylate-carbon monoxide terpolymer.

In each or any of the above- or below-mentioned embodiments, the carbon monoxide-containing polyolefin-based copolymer may be in an amount from about 45% to about 80% by weight of the polymer blend.

In each or any of the above- or below-mentioned embodiments, the carbon monoxide-containing polyolefin-based copolymer may be in an amount from about 50% to about 70% by weight of the polymer blend.

In each or any of the above- or below-mentioned embodiments, the propylene and α-olefin copolymer may be in an amount from about 15% to about 50% by weight of the polymer blend.

In each or any of the above- or below-mentioned embodiments, the propylene and α-olefin copolymer may be in an amount from about 25% to about 45% by weight of the polymer blend.

In each or any of the above- or below-mentioned embodiments, the propylene and α-olefin copolymer may have an α-olefin content of from about 1% to about 10% by weight of the copolymer.

In each or any of the above- or below-mentioned embodiments, the polymer blend includes an ethylene-methyl acrylate copolymer in an amount from about 2% to about 8% by weight of the polymer blend.

The present disclosure also provides multi-layer articles comprising a first layer comprising polyvinyl chloride, and a second layer attached to the first layer. The second layer may comprise a polymer blend including (1) a propylene and α-olefin copolymer in an amount from about 15% to about 70% by weight of the polymer blend, and (2) a carbon monoxide-containing polyolefin-based copolymer in an amount from about 25% to about 85% by weight of the polymer blend. In one embodiment, the polymer blend has an extractable fraction having a pH higher than 5 when an extraction is performed according to Chinese Standard YBB00242004-2015 and the pH is measured in accordance with General Rule 0631 of Chinese Pharmacopoeia 2015, Part 4.

In each or any of the above- or below-mentioned embodiments, the multi-layer article may comprise a third layer attached to the second layer opposite the first layer, and the third layer may comprise a polyolefin.

The present disclosure also provides multi-layer articles comprising a first layer comprising polyvinyl chloride, and a second layer attached to the first layer, wherein the second layer comprises a polymer blend including (1) a propylene and α-olefin copolymer in an amount from about 15% to about 70% by weight of the polymer blend, and (2) an ethylene-n-butyl acrylate-carbon monoxide copolymer in an amount from about 25% to about 85% by weight of the polymer blend.

In each or any of the above- or below-mentioned embodiments, the ethylene-n-butyl acrylate-carbon monoxide copolymer may be in an amount from about 45% to about 80% by weight of the polymer blend.

In each or any of the above- or below-mentioned embodiments, the ethylene-n-butyl acrylate-carbon monoxide copolymer may be in an amount from about 50% to about 70% by weight of the polymer blend.

The present disclosure also provides methods of bonding a first polyvinyl chloride component to a second polyolefin component. The methods comprise attaching a polymer blend to the second polyolefin component, wherein the polymer blend includes (1) a propylene and α-olefin copolymer in an amount from about 15% to about 70% by weight of the polymer blend, and (2) a carbon monoxide-containing polyolefin-based copolymer in an amount from about 25% to about 85% by weight of the polymer blend. The first polyvinyl chloride component is solvent bonded to the polymer blend. The polymer blend has a pH higher than 5 when an extraction is performed according to Chinese Standard YBB00242004-2015 and the pH is measured in accordance with General Rule 0631 of Chinese Pharmacopoeia 2015, Part 4.

In each or any of the above- or below-mentioned embodiments, the polymer blend may be attached to the second polyolefin component by overmolding.

In each or any of the above- or below-mentioned embodiments, the first polyvinyl chloride component and the polymer blend may be solvent bonded using a solvent selected from the group consisting of cyclohexanone, methyl ethyl ketone, tetrahydrofuran, and dichloromethane.

In each or any of the above- or below-mentioned embodiments, the first polyvinyl chloride component and the polymer blend may be autoclave bonded.

In each or any of the above- or below-mentioned embodiments, a third polyolefin component may be autoclave bonded to the second polyolefin component opposite the first polyvinyl chloride component.

It is accordingly an advantage of the present disclosure to provide a multi-layer article with increased average peeling force from a PVC monolayer and/or a polyolefin-based monolayer.

It is a further advantage of the present disclosure to provide a method in which a polymer blend formulation is attached to a PVC monolayer and/or a polyolefin-based monolayer, and then autoclaved at 121° C. for 60 minutes, wherein the attachment may not be deteriorated by the autoclave bonding.

Additional features and advantages of the disclosed articles, systems, and methods are described in, and will be apparent from, the following Detailed Description and the FIGURE. The features and advantages described herein are not all-inclusive and, in particular, many additional features and advantages will be apparent to one of ordinary skill in the art in view of the FIGURE and description. Also, any particular embodiment need not have all of the advantages listed herein. Moreover, it should be noted that the language used in the specification has been principally selected for readability and instructional purposes, and not to limit the scope of the inventive subject matter.

DETAILED DESCRIPTION

The present disclosure provides multi-layer articles and methods for producing the same. In a hybrid CAPD container system using non-PVC materials for the components contacting the peritoneal dialysis solution during sterilization, while using PVC for other parts of the system, a non-PVC injection molded part may be connected to a PVC based component. The injection molded parts currently on the market may be usually made from polycarbonate or proprietary polymer blends. Polycarbonate is made from bisphenol A, and there are debates about the health risk of exposure to bisphenol A from foods. On the other hand, proprietary polymer blends, such as those disclosed in WO 2004/026961, assigned to the same assignee of the present invention, may include polypropylene, polyester elastomers, polyurethanes, and polyethylene vinyl acetate copolymer. The bonding of such proprietary polymer blends to PVC and to a polyolefin-based material might weaken during steam sterilization, and as a result medical devices or components that include such bonds may not have satisfactory function.

Figure 1:
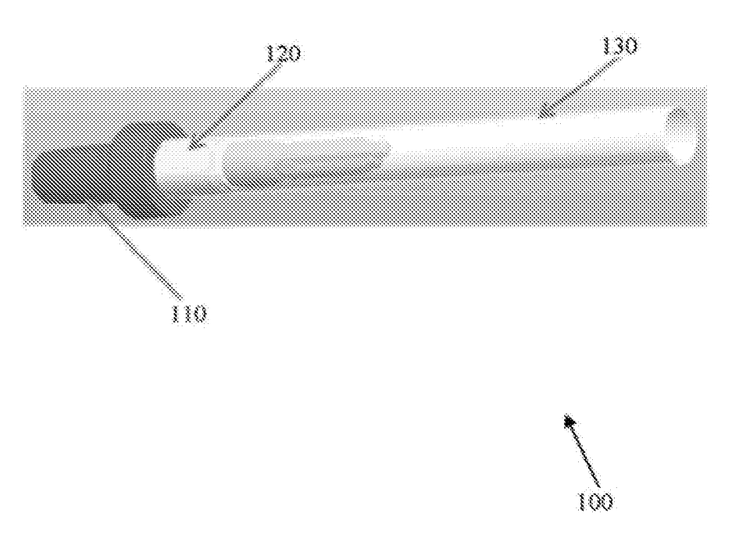
FIG. 1 is a perspective view of a multi-layer article according to an embodiment of the present disclosure.

Referring to FIG. 1, the multi-layer article 100 of the present disclosure includes a polyolefin component 110 and a polymer blend 120 attached to the polyolefin component 110. The present inventors have surprisingly discovered that the adhesion (e.g., bond strength) of a PVC based component 130 to the polymer blend 120 could be improved by using a polymer blend including (1) a propylene and α-olefin copolymer in an amount from about 15% to about 70% by weight of the polymer blend, and (2) a carbon monoxide-containing polyolefin-based copolymer in an amount from about 25% to about 85% by weight of the polymer blend, wherein the polymer blend has a pH higher than 5. The polymer blend can bond with a polyolefin-material by autoclave heat bonding and form an autoclave-enduring connection with PVC by solvent bonding. The new polymer blend formulation includes no bisphenol A structure unit and therefore would not release bisphenol A during steam sterilization. The polymer backbone of the components in the polymer blend formulation does not include an ester group, so its bonding with PVC may not be deteriorated by autoclave bonding.

In some embodiments, the carbon monoxide-containing polyolefin-based copolymer suitable for use in the disclosure may be selected from the group consisting of ethylene-$C_{1-8}$ alkyl acrylate-carbon monoxide terpolymer and ethylene-$C_{1-8}$ alkyl methacrylate-carbon monoxide terpolymer. In some embodiments, the carbon monoxide-containing polyolefin-based copolymer suitable for use in the disclosure is an ethylene-n-butyl acrylate-carbon monoxide copolymer. Such a copolymer is sold by E.I. du Pont de Nemours and Company, Inc. under the tradename Elvaloy® HP441. The carbon monoxide-containing polyolefin-based copolymer can be included in the polymer blend in an amount from about 45% to about 80% by weight of the polymer blend, or from about 50% to about 70% by weight of the polymer blend.

In some embodiments, the propylene and α-olefin copolymer according to the disclosure may be a terpolymer sold by Borealis AG under the tradename Bormed TD109CF. In some embodiments, the propylene and α-olefin copolymer is included in the polymer blend in an amount from about 15% to about 50% by weight of the polymer blend, or from about 25% to about 45% by weight of the polymer blend. In some embodiments, the propylene and α-olefin copolymer according to the disclosure may have an α-olefin content of from about 1% to about 10% by weight of the copolymer.

In some embodiments, the polymer blend according to the disclosure may comprise an ethylene-methyl acrylate copolymer in an amount from about 2% to about 8% by weight of the polymer blend. Such a copolymer is sold by E.I. du Pont de Nemours and Company, Inc. under the tradename Elvaloy® AC 1820. Depending on the usage requirements or preferences for the particular application, the propylene and α-olefin copolymer and the carbon monoxide-containing polyolefin-based copolymer may be blended with one or more additives to make the polymer blend. For example, the polymer blend may comprise a colorant or other additives. The additives may be blended into the polymer blend in an amount from about 0.001% to about 20.0%, more preferably from about 0.01% to about 10.0%, and most preferably from about 0.02% to about 4.0%.

In some embodiments, the polymer blend according to the disclosure may be integrally attached to the polyolefin component by overmolding, forming a unitary-one-piece body. In some embodiments, a PVC component is solvent bonded to the polymer blend according to the disclosure opposite the polyolefin component. Solvent bonding refers to exposure of one of the polymeric components to a solvent to dissolve or swell the polymeric component and then attach the polymeric component to another polymeric component to form a permanent bond. Suitable solvents typically include those having a solubility parameter of less than about 20 $(MPa)^{1/2}$, more preferably less than about 19 $(MPa)^{1/2}$ and most preferably less than about 18 $(MPa)^{1/2}$ and include, but are not limited to, aliphatic hydrocarbons, aromatic hydrocarbons, mixtures of aliphatic hydrocarbons, mixtures of aromatic hydrocarbons and mixtures of aromatic and aliphatic hydrocarbons. Suitable aliphatic hydrocarbons include substituted and unsubstituted hexane, heptane, cyclohexane, cycloheptane, decalin, and the like. Suitable aromatic hydrocarbons include substituted and unsubstituted aromatic hydrocarbon solvents such as xylene, tetralin, toluene, and cumene. Suitable hydrocarbon substituents include aliphatic substituents having from 1-12 carbons and include propyl, ethyl, butyl, hexyl, tertiary butyl, isobutyl and combinations of the same. Suitable solvents will also have a molecular weight less than about 200 g/mole, more preferably less than about 180 g/mole and most preferably less than about 140 g/mole. In some embodiments, the solvent is selected from the group consisting of cyclohexanone, methyl ethyl ketone, tetrahydrofuran, and dichloromethane.

In some embodiments, the PVC component solvent bonded to the polymer blends according to the disclosure may be a PVC tubing (e.g., a tubing for use in a medical application) fabricated using standard polymer processing techniques such as extrusion, coextrusion, blow extrusion, blow molding, injection molding and the like. The tubing may have an inner diameter dimension within the range of 0.003-0.4 inches (0.08-10.16 mm), and an outer diameter dimension within the range of 0.12-0.50 inches (3.05-12.70 mm) depending on the usage requirements or preferences for the particular application.

The present disclosure further provides solvent bonded components such as components of a device used for peritoneal dialysis, hemodialysis, hemofiltration, hemodiafiltration, or continuous renal replacement therapy (CRRT). The components may be solvent bonded together by applying a solvent to one of the first layer or the second layer to define an interface area; and bonding the first layer to the second layer along the interface area.

In some embodiments, the multi-layer article according to the disclosure may comprise a PVC component (e.g., PVC tubing) autoclave bonded to the polymer blend. In some embodiments, an appropriate amount of lubricant (e.g., iso-propanol or ethanol) is applied on one of the PVC component and the polymer blend, and autoclaving is carried out in the temperature range of 119 to 122° C. for a period of time ranging from 10 to 60 minutes. Lubricants for use in the autoclaving according to the disclosure are well known in the art. In an embodiment, the methods according to the disclosure may not require any processing aid such as a lubricant. In some embodiments, a polyolefin tube may be autoclave bonded to the polyolefin component that is attached to the polymer blend, opposite the PVC component.

In some embodiments, the polymer blend has extractables having a pH higher than 5, e.g., 5, 5.1, 5.2, 5.3 or higher. Depending on the usage requirements or preferences for the particular multi-layer article, a pH less than 5 for the polymer blend's extractables may not provide the requisite adhesion strength, as further explained below. As used in this disclosure, the pH of a polymer blend means the pH of the blend's extractables when extraction is performed according to Chinese Standard YBB00242004-2015 and the pH of the extractables is measured according to Chinese Pharmacopoeia 2015, Part 4, General Rule 0631.

The following are non-limiting examples of multi-layer articles according to the present disclosure. Persons having ordinary skill in the art will appreciate that variations of the following examples are possible within the scope of the invention, which is defined solely by the claims.

Example 1

Raw material resins of the polymer blend formulations were dry blended in a plastic bag by manual tumbling. The dry blends were fed into a twin-screw extruder (model LTE16-40 from Lab-Tech) with screws of an outer diameter of 16 mm and an L/D ratio of 40. Table 1 below provides the parameter settings of the screws.

TABLE 1

| Parameter settings of twin-screw extruder for monolayer preparation | | | | | | | | | |
|---|---|---|---|---|---|---|---|---|---|
| Zone 1 | Zone 2 | Zone 3 | Zone 4 | Zone 5 | Zone 6 | Zone 7 | Zone 8 | Zone 9 | Zone 10 |

| | Zone 1 | Zone 2 | Zone 3 | Zone 4 | Zone 5 | Zone 6 | Zone 7 | Zone 8 | Zone 9 | Zone 10 |
|---|---|---|---|---|---|---|---|---|---|---|
| Temperature (° C.) | 70 | 150 | 180 | 180 | 180 | 180 | 180 | 180 | 180 | 180 |
| Feeder speed (rpm) | | | | | 15 | | | | | |
| Screw speed (rpm) | | | | | | 190 | | | | |

The melt was fed into gear pump (Model GEAR PUMP 3CC from Lab-Tech) and then extruded from a 5 inch wide film die. The temperatures of gear pump and die were set at 180° C. The extruded melt was cooled on the cooling roll of film collector (model LBCR-150 from Lab-Tech) and then collected as monolayer of a thickness about 0.8 mm. Table 2 below provides the parameters of the film collector.

TABLE 2

Parameter settings of film collector for monolayer preparation

| | |
|---|---|
| Pulling speed (rpm) | 2.3 |
| Roll speed (rpm) | 0.7 |
| Cooling water temp (° C.) | 22 |

The pH test was conducted with the monolayer film according to YBB00242004-2015. A film of a surface area of 1200 cm² was cut into 0.5 cm×5 cm strips, washed with 400 ml water for three times and then steam sterilized with 400 ml water at 121° C. for 30 minutes. When the solution was cooled down, a 20 ml solution was measured, and a 1 ml KCl solution (1 g/1000 ml water) was added into the solution. The pH of the solution was measured according to Chinese Pharmacopoeia, 2015, Part 4, General Rule 0631, and the average pH of three repetitions was reported.

For the peel test, the monolayer was cut into a 15 mm wide strip. Cyclohexanone (for PVC monolayer) or isopropanol (for polyolefin monolayer) was applied on the monolayer with a sponge. The formulation for the polyolefin-based monolayer was 37% by weight Borealis TD109CF (a propylene-alpha olefin terpolymer), 33% by weight Borealis SC820CF (a propylene random-heterophasic copolymer), and 30% by weight Kraton G1645M0 (a SEBS linear triblock copolymer). A 15 mm wide strip of PVC monolayer or polyolefin monolayer was stacked on the monolayer. Three pairs of monolayer stack were arranged in parallel and sandwiched between two stainless steel plates. An extra weight of 0.79 kg was applied on the top of the upper stainless steel plate. The stainless steel/monolayer stack/stainless steel sandwiches were placed in a fume hood for at least 24 h and were then autoclaved at 121° C. for 60 minutes. After steam sterilization, the sandwich was placed in a fume hood for at least 24 h before testing. The 0.79-kg weight was kept on the sandwich during autoclave and after autoclave until the testing.

The peel strength test was performed according to Chinese Standard YBB00122003-2015 using an INSTRON tensile tester. The test was performed at a crosshead speed of 300 mm/minute with a gauge length of 20 mm. The maximum load was recorded. The average of three repetitions was reported.

Tables 3 and 4 below provide the polymer blend formulations, along with certain measured properties of the polymer blends, in particular the peeling force of a monolayer of polymer blend formulation.

The increase in average peeling force (N) in formulations containing ethylene-co-n butyl acrylate-co-carbon monoxide terpolymer (Elvaloy HP441) was unexpected and surprising. In particular, in Example 7 containing 65% by weight Elvaloy HP441, 30% by weight Borealis RD808CF, and 5% by weight Elvaloy AC 1820, an average peeling force from the PVC monolayer of 2.1 N was obtained. In contrast, when the same amounts of Borealis RD 808CF and Elvaloy AC 1820 were used with Elvaloy 742 (ethylene/vinyl acetate/carbon monoxide copolymer) in Example 3, the average peeling force from the PVC monolayer was 57% less than that of Example 7. Furthermore, in Example 4 containing 45% by weight Elvaloy HP441, 50% by weight Borealis RD808CF, and 5% by weight Elvaloy AC 1820, an average peeling force from the PVC monolayer of 0.8 N was obtained. In contrast, when the same amounts of Borealis RD808CF and Elvaloy AC 1820 were used with Elvaloy 742 in Example 2, the average peeling force from the PVC monolayer was 25% less than that of Example 4.

TABLE 3

Post-autoclave peeling force of a monolayer of formulations

| Component | Baseline | Example 1 | Example 2 | Example 3 | Example 4 |
|---|---|---|---|---|---|
| Elvaloy AC 1330 (wt %) | | | | | |
| Elvaloy AC 1820 (wt %) | | 5 | 5 | 5 | 5 |
| Elvaloy 742 (wt %) | | 25 | 45 | 65 | |
| Elvaloy HP441 (wt %) | | | | | 45 |
| Borealis RD804CF (wt %) | 23 | | | | |
| Borealis RD808CF (wt %) | 46 | 70 | 50 | 30 | 50 |
| Borealis TD109CF (wt %) | | | | | |
| Celanese EVA 2803G (wt %) | 29 | | | | |
| PolyOne Green CC10174982WE (wt %) | 2 | | | | |
| Average peeling force from a PVC monolayer N | 0.2 | 0.4 | 0.6 | 0.9 | 0.8 |
| Average peeling force from a polyolefin-based monolayer (N) | 7.6 | | | | |
| pH | 5.7 | 3.5 | 3.4 | 3.4 | 5.3 |

TABLE 4

Post-autoclave peeling force of a monolayer of formulations

| Component | Example 5 | Example 6 | Example 7 | Example 8 | Example 9 | Example 10 | Example 11 | Example 12 | Example 13 | Example 14 | Example 15 | Example 16 | Example 17 |
|---|---|---|---|---|---|---|---|---|---|---|---|---|---|
| Elvaloy AC 1330 (wt %) | 5 | | | | | | | | | | | | |
| Elvaloy AC 1820 (wt %) | | 5 | 5 | 2 | 2 | 5 | 7.5 | 2 | 5 | 2 | | | 5 |
| Elvaloy 742 (wt %) | | | | | | | | | | | | | |
| Elvaloy HP441 (wt %) | 45 | 55 | 65 | 55 | 55 | 65 | 65 | 68 | 80 | 83 | 65 | 45 | 55 |
| Borealis RD804CF (wt %) | | | | | | | | | | | | | |

TABLE 4-continued

Post-autoclave peeling force of a monolayer of formulations

| Component | Example 5 | Example 6 | Example 7 | Example 8 | Example 9 | Example 10 | Example 11 | Example 12 | Example 13 | Example 14 | Example 15 | Example 16 | Example 17 |
|---|---|---|---|---|---|---|---|---|---|---|---|---|---|
| Borealis RD808CF (wt %) | 50 | 40 | 30 | 43 | | | | | | | | | |
| Borealis TD109CF (wt %) | | | | | 43 | 30 | 27.5 | 30 | 15 | 15 | 35 | 55 | 40 |
| Celanese EVA 2803G (wt %) | | | | | | | | | | | | | |
| PolyOne Green CC10174982 WE (wt %) | | | | | | | | | | | | | |
| Average peeling force from a PVC monolayer (N) | 0.9 | 1.1 | 2.1 | 1.2 | 1.5 | 2.4 | 4.2 | 4.3 | 19.8 | 11.2 | 5.7 | 1.0 | 1.8 |
| Average peeling force from a polyolefin-based monolayer (N) | | | | | | 2.7 | | | 2 | | 2.4 | 2.2 | 3.3 |

As shown by the experimental results in Table 4, the polymer blend formulations with about 50% to about 70% by weight of ethylene-co-n-butyl acrylate co-carbon monoxide terpolymer (Examples 10, 15, and 17) exhibited a better balance in bonding with the PVC monolayer and the polyolefin-based monolayer, compared to Examples 13 and 16. The increases in average peeling force with the PVC monolayer and the polyolefin-based monolayer of Examples 10, 15, and 17 were unexpected and surprising.

Formulations containing ethylene-vinyl acetate-carbon monoxide terpolymer (e.g., Elvaloy 742) exhibited a low pH (less than 5.0) in extraction test. Without wishing to be bound to any particular theory, it is believed that acidic substances are released from the polymer blend containing Elvaloy 742. Those acidic substances might bring a health risk to a patient if the blend is used in a medical device. In contrast, formulations containing ethylene-co-n-butyl acrylate-co-carbon monoxide terpolymer (e.g., Elvaloy HP441) exhibit a pH higher than 5.0. The increased average pH can be desirable for a medical device.

Example 2

Multi-layer articles were provided by injection molding. Table 5 below provides representative temperature settings for molding the multi-layer articles.

TABLE 5

Representative temperature settings for molding the multi-layer article

| | Hot runner temperature (° C.) | Nozzle temperature (° C.) | Barrel temperature 1 (° C.) | Barrel temperature 2 (° C.) | Barrel temperature 3 (° C.) | Mold coolant temperature (° C.) |
|---|---|---|---|---|---|---|
| First layer | 211 | 190 | 185 | 185 | 180 | 15 |
| Second layer | 200 | 190 | 185 | 185 | 175 | 15 |

Peeling force tests were performed on the multi-layer articles. For the peel test, cyclohexanone was applied by a sponge on the shaft of the multi-layer article, which was then immediately assembled with PVC tubing. The difference of the outer diameter of the shaft of the multi-layer article and the inner diameter of the PVC tubing was about 0.4 mm. The assemblies were placed in a fume hood for 24 h before autoclave. After autoclave at 121° C. for 60 min, the PVC tubing of the subassembly was first cut into two halves with a sharp blade. The cutting was carefully done so that the blade cut PVC tubing through the whole thickness. The assembly was then mounted on a fixture to avoid the movement of the multi-layer article. The two halves of PVC tubing were peeled off from the shaft of the article sequentially at a crosshead speed of 500 mm/min. The maximum force was recorded as peeling force. Sample size was 5 for each group.

Table 6 below provides the polymer blend formulations along with the peeling force of the multi-layer articles.

TABLE 6

Post-autoclave peeling force of multi-layer articles

| | First layer material | Second layer material | Average peeling force from PVC tubing (N) |
|---|---|---|---|
| Comparative example | 46% Borealis RD808CF + 29% Celanese EVA 2803G + 23% Borealis RD804CF + 2 % PolyOne Green CC10174982WE | 40% Hytrel PC956 + 30% Borealis RD808CF + 30% Bynel 3810 | 2.3 |
| Example 18 | 46% Borealis RD808CF + 29% Celanese EVA 2803G + 23% Borealis RD804CF + 2% PolyOne Green CC10174982WE | 44.1% Elvaloy HP441 + 49.0% Borealis TD109CF + 4.9% Elvaloy AC1820 + 2% PolyOne Green CC10174982WE | 10.1 |
| Example 19 | 46% Borealis RD808CF + 29% Celanese EVA 2803G + 23% Borealis RD804CF + 2% PolyOne Green CC10174982WE | 63.7% Elvaloy HP441 + 29.4% Borealis TD109CF + 4.9% Elvaloy AC1820 + 2% PolyOne Green CC10174982WE | 17.0 |
| Example 20 | 46% Borealis RD808CF + 29% Celanese EVA 2803G + 23% Borealis RD804CF + 2% PolyOne Green CC10174982WE | 78.4% Elvaloy HP441 + 14.7% Borealis TD109CF + 4.9% Elvaloy AC1820 + 2% PolyOne Green CC10174982WE | 42.3 |

The increase in average peeling force (N) in multi-layer articles containing ethylene-co-n butyl acrylate-co-carbon monoxide terpolymer (Elvaloy HP441) in the second layer was unexpected and surprising. In particular, in Examples 18-20 containing 44.1% by weight Elvaloy HP441, 63.7% by weight Elvaloy HP441, and 78.4% by weight Elvaloy HP441 in the second layer, an average peeling force from the PVC tubing of 10.1 N, 17.0 N, and 42.3 N was obtained, respectively. In contrast, when Elvaloy HP441 was not used in the second layer, as in the comparative example using the polymer blend formulation disclosed in WO 2004/026961 as the second layer, the average peeling force from the PVC tubing was significantly less—2.3 N.

As used herein and unless specified otherwise, the terms "wt. %" and "wt %" are intended to refer to the composition of the identified element in "dry" (non water) parts by weight of the entire composition (when applicable).

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Unless otherwise indicated, all numbers expressing quantities of ingredients, properties such as molecular weight, reaction conditions, and so forth used in the specification and claims are to be understood as being modified in all instances by the term "about."

The terms "a," "an," "the" and similar referents used in the context of describing the disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the disclosure and does not pose a limitation on the scope of the disclosure otherwise claimed. No language in the specification should be construed as indicating any non-claimed element essential to the practice of the disclosure.

Groupings of alternative elements or embodiments of the disclosure disclosed herein are not to be construed as limitations. Each group member can be referred to and claimed individually or in any combination with other members of the group or other elements found herein. It is anticipated that one or more members of a group can be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments of this disclosure are described herein, including the best mode known to the inventors for carrying out the disclosure. Of course, variations on these described embodiments will become apparent to those of ordinary skill in the art upon reading the foregoing description. The inventor expects skilled artisans to employ such variations as appropriate, and the inventors intend for the disclosure to be practiced otherwise than specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

Specific embodiments disclosed herein can be further limited in the claims using consisting of or and consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of the disclosure so claimed are inherently or expressly described and enabled herein.

It is to be understood that the embodiments of the disclosure disclosed herein are illustrative of the principles of the present disclosure. Other modifications that can be employed are within the scope of the disclosure. Thus, by way of example, but not of limitation, alternative configurations of the present disclosure can be utilized in accordance with the teachings herein. Accordingly, the present disclosure is not limited to that precisely as shown and described.

While the present disclosure has been described and illustrated herein by references to various specific materials, procedures and examples, it is understood that the disclosure is not restricted to the particular combinations of materials and procedures selected for that purpose. Numerous variations of such details can be implied as will be appreciated by those skilled in the art. It is intended that the specification and examples be considered as exemplary, only, with the true scope and spirit of the disclosure being indicated by the following claims. All references, patents, and patent applications referred to in this application are herein incorporated by reference in their entirety.

The invention claimed is:

1. A multi-layer article comprising:
 a polyolefin component; and
 a polymer blend attached to the polyolefin component, wherein the polymer blend includes (1) a propylene and α-olefin copolymer in an amount from about 15% to about 55% by weight of the polymer blend, and (2) a carbon monoxide-containing polyolefin-based copolymer comprising an ethylene-n-butyl acrylate-carbon monoxide copolymer in an amount from about 45% to about 83% by weight of the polymer blend, and wherein the polymer blend has an extractable fraction having a pH higher than 5 when an extraction is performed according to Chinese Standard YBB00242004-2015 and the pH is measured in accordance with General Rule 0631 of Chinese Pharmacopoeia 2015, Part 4.

2. The multi-layer article of claim 1, wherein the polymer blend is attached to the polyolefin component by overmolding.

3. The multi-layer article of claim 1, wherein the carbon monoxide-containing polyolefin-based copolymer is in an amount from about 45% to about 80% by weight of the polymer blend.

4. The multi-layer article of claim 1, wherein the carbon monoxide-containing polyolefin-based copolymer is in an amount from about 50% to about 70% by weight of the polymer blend.

5. The multi-layer article of claim 1, wherein the propylene and α-olefin copolymer is in an amount from about 15% to about 50% by weight of the polymer blend.

6. The multi-layer article of claim 1, wherein the propylene and α-olefin copolymer is in an amount from about 25% to about 45% by weight of the polymer blend.

7. The multi-layer article of claim 1, wherein the propylene and α-olefin copolymer has an α-olefin content of from about 1% to about 10% by weight of the copolymer.

8. The multi-layer article of claim 1 comprising a third layer attached to the second layer opposite the first layer, wherein the third layer comprises a polyolefin.

9. A multi-layer article comprising:
 a first layer comprising polyvinyl chloride; and
 a second layer attached to the first layer, wherein the second layer comprises a polymer blend including (1) a propylene and α-olefin copolymer in an amount from about 15% to about 70% by weight of the polymer blend, and (2) an ethylene-n-butyl acrylate-carbon monoxide copolymer in an amount from about 25% to about 85% by weight of the polymer blend.

10. The multi-layer article of claim 9, wherein the ethylene-n-butyl acrylate-carbon monoxide copolymer is in an amount from about 45% to about 80% by weight of the polymer blend.

11. The multi-layer article of claim 9, wherein the ethylene-n-butyl acrylate-carbon monoxide copolymer is in an amount from about 50% to about 70% by weight of the polymer blend.

12. The multi-layer article of claim 9, wherein the propylene and α-olefin copolymer is in an amount from about 15% to about 50% by weight of the polymer blend.

13. The multi-layer article of claim 9, wherein the propylene and α-olefin copolymer is in an amount from about 25% to about 45% by weight of the polymer blend.

14. The multi-layer article of claim 9, wherein the propylene and α-olefin copolymer has an α-olefin content of from about 1% to about 10% by weight of the copolymer.

15. The multi-layer article of claim 9, wherein the polymer blend includes an ethylene-methyl acrylate copolymer in an amount from about 2% to about 8% by weight of the polymer blend.

16. The multi-layer article of claim 9 comprising a third layer attached to the second layer opposite the first layer, wherein the third layer comprises a polyolefin.

17. A method of bonding a first polyvinyl chloride component to a second polyolefin component, the method comprising:
 attaching a polymer blend to the second polyolefin component, wherein the polymer blend includes (1) a propylene and α-olefin copolymer in an amount from about 15% to about 70% by weight of the polymer blend, and (2) a carbon monoxide-containing polyolefin-based copolymer comprising an ethylene-n-butyl acrylate-carbon monoxide copolymer in an amount from about 25% to about 85% by weight of the polymer blend, and wherein the polymer blend has an extractable fraction having a pH higher than 5 when an extraction is performed according to Chinese Standard YBB00242004-2015 and the pH is measured in accordance with General Rule 0631 of Chinese Pharmacopoeia 2015, Part 4; and solvent bonding the first polyvinyl chloride component to the polymer blend.

18. The method of claim 17, wherein the first polyvinyl chloride component and the polymer blend are autoclave bonded.

19. The method of claim 17 comprising autoclave bonding a third polyolefin component to the second polyolefin component opposite the first polyvinyl chloride component.

* * * * *